INVENTOR.
CHARLES T. ROTH
BY Anthony D. Cennamo
Daniel Rubin
ATTORNEYS

INVENTOR.
CHARLES T. ROTH
BY Anthony D. Cennamo
Daniel Rubin
ATTORNEYS

INVENTOR.
CHARLES T. ROTH
BY Anthony D. Cennamo
Daniel Rubin
ATTORNEYS

INVENTOR.
CHARLES T. ROTH
BY Anthony D. Cennamo
Daniel Rubin
ATTORNEYS

INVENTOR.
CHARLES T. ROTH
BY Anthony D. Cennamo
Daniel Rubin
ATTORNEYS

INVENTOR.
CHARLES T. ROTH
BY
ATTORNEYS

United States Patent Office 3,426,144
Patented Feb. 4, 1969

3,426,144
TRANSCEIVER APPARATUS FOR TRANSMITTING AND RECORDING OPTICAL INFORMATION

Charles T. Roth, Webster, N.Y., assignor to Xerox Corporation, Rochester, N.Y., a corporation of New York
Filed Sept. 20, 1965, Ser. No. 488,470
U.S. Cl. 178—6.6 9 Claims
Int. Cl. H04n 5/76

ABSTRACT OF THE DISCLOSURE

Transceiver apparatus for simultaneously and/or alternately transmitting and recording optical intelligence information and including common optical scanning means comprising a partially pyramidally-formed multi-faced mirror rotating continuously about a concentric axis extending from its base and a projection lens supported with its optical axis coaxially aligned with the rotational axis of said mirror.

This invention relates to facsimile apparatus for transmitting and recording information intelligence. More specifically, the invention relates to a facimile apparatus capable of transmitting and/or recording intelligence at high rates of speed via a common optical scanner.

There is in common use today many forms of scanning mechanisms, capable for example of scanning a graphic original such that the information obtained can be converted into corresponding electrical pulses. These include and incorporate such well known techniques as light sensors, associated with a CRT spot, as well as various types of mechanical scanners. Typical of the latter are, for example, those including a radial slit as disclosed in U.S. Patent 2,978,590, the spiral scanner disclosed in U.S. Patent 2,912,497, a turret lens as disclosed in U.S. Patent 3,100,242, as well as well known forms of rotating reflective prisms. Each of these are well proven and enjoy commercial success in their particular areas of utility. Notwithstanding, each of these is handicapped in their inability to be more universally adapted to a variety and wide range of applications. For example, the CRT system is relatively complex as to have an inherently high cost of fabrication while not being readily adaptable to low speed operation. The radial slit scanner employs a moving aperture created by the inner section of a radial slit located on a high speed rotating disk and utilizes a fixed, horizontal aperture equal in length to the document being scanned. As the disk rotates and intersects the fixed slit, light is gated through the aperture to an optical system which directs the light to a photoreceptive surface. Scanners of this type have been generally limited to applications of character recognition requiring an extremely narrow scan width as not to be readily adaptable to facimile requirements. The spiral scanner on the other hand, is similar to the radial slit scanner and employs a rotating disk containing an involute spiral generated from a base circle. Since only one scan is obtained per revolution with the disk radius approximately equal to the scan length, excessively high disk speeds and large disk diameters are required. The rotating lens turret device has self-imposed speed limitations by virtue of the mass involved in constructing such a device. With regard to the rotating multi-sided prism, the most obvious shortcoming is the variation in optical path which results as the scanning spot moves from the center to the edge of a flat document being scanned. This, of course, results in an out of focus condition at some portions of the scan. At the same time, the prism is characterized by a percentage of "blank" time associated with the corners thereof as it passes the scanning area.

Recently, I have discovered a novel, mechanically operable optical scanning apparatus having substantially greater utility than such prior art devices as to overcome the handicaps associated therewith. In accordance therewith, the scanner comprises a rotating, truncated or pyramidal polygonal mirror aligned coaxially with an objective lens focusing the light information onto the scan line by reflecting light to or from the mirror facets. The polygonal mirror is symmetrical about the axis of the lens and is small since the diameter only need cover the diameter of the lens aperture. At the same time operating speeds are modest and capable of wide variation. If desired it can be adapted to effect a zero blank time by adjusting the radius from the scan line to the center of polygon rotation whereby the distance between scanning spots from contiguous facets becomes equal to the length of scan.

Now in accordance with the instant invention there has been discovered a novel facimile apparatus utilizing the above scanning unit and which alternatively can simultaneously remotely transmit a graphic original while the original is being internally recorded, can transmit a graphic original while simultaneously receiving and recording other intelligence information, or can independently and separately transmit or receive-record such information. The advantages thereof should be instantly apparent in that the apparatus offers greater flexibility than comparable duplex units of the prior art while requiring fewer operating components as to be more economical to construct.

Accordingly, it is an object of the invention to provide a novel facsimile apparatus capable of separately or simultaneously transmitting and/or recording received intelligence information by employing a common optical scanning device.

It is a further object of the invention to provide a novel facsimile apparatus capable of simultaneously transmitting and recording different intelligence information via a commonly employed optical scanning device.

Further objects and features of the invention will become apparent by reading the following description in connection with the drawings wherein.

Figure 1:
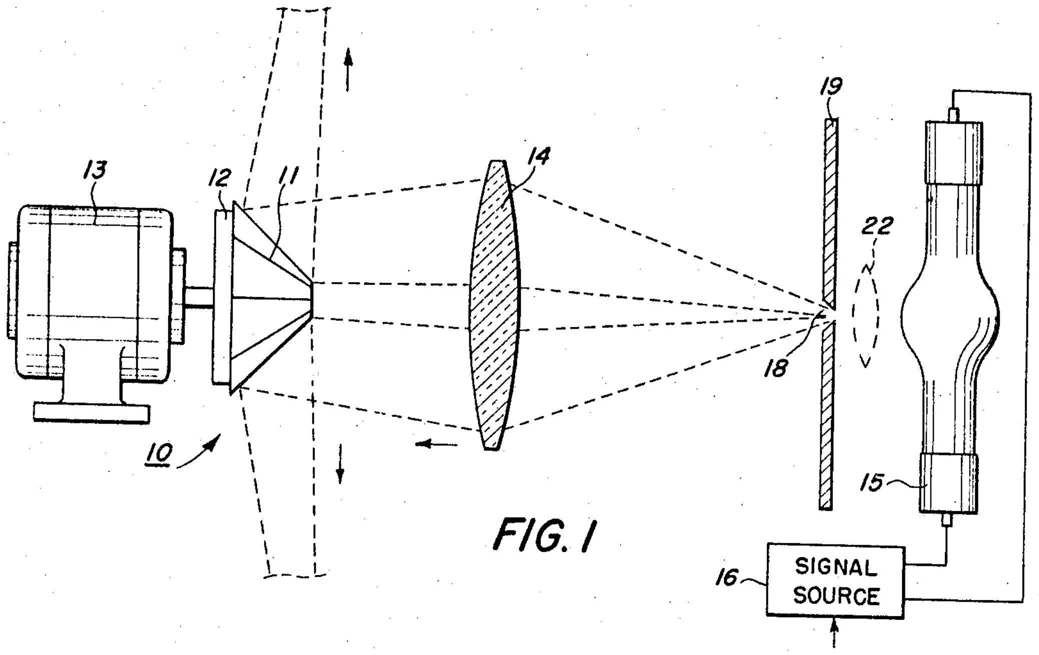
FIG. 1 is a side view of a scanning unit in accordance herewith.
Figure 2:
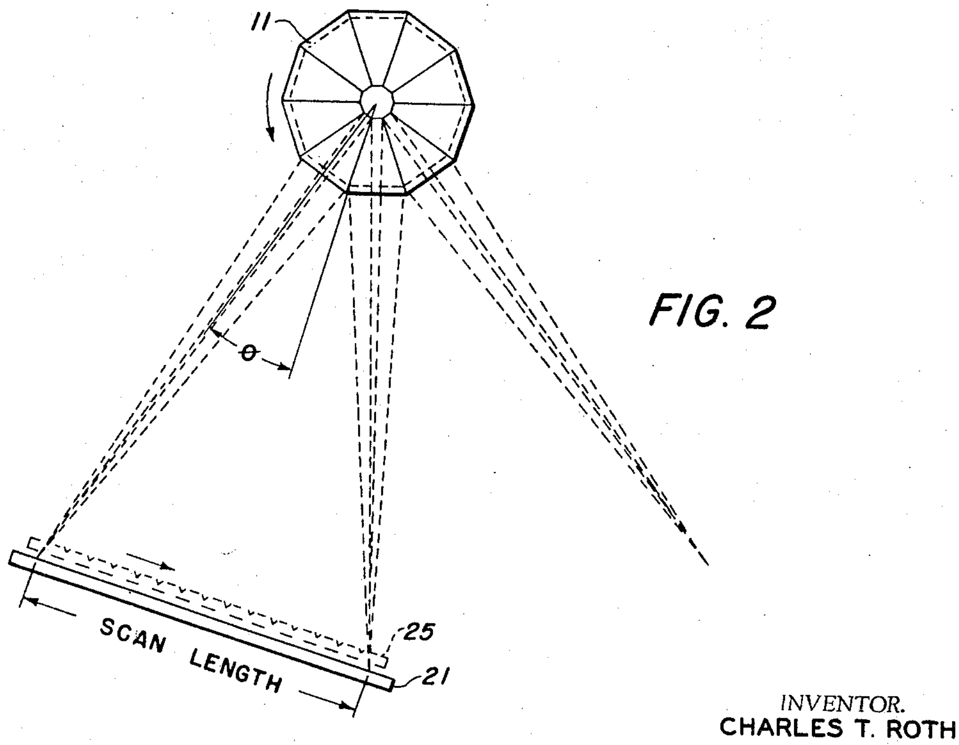
FIG. 2 is a top axial view of the polygon member.

Referring now to FIGS. 1 and 2 there is shown the scanning unit used herewith designated 10 and comprising a multisided pyramidal or truncated polygonal mirror 11 secured on a turntable 12 and continuously rotated by means of motor 13. The polygon is arranged coaxially, symmetrical about an objective lens 14 with each of the facets thereof extending from the apex about 45° relative to the axis of rotation. Light of high intensity impinging on the polygon faces is emitted, for example, from a high intensity arc lamp 15 that is modulated in accordance with received intelligence information by a signal source 16. The arc of the lamp is imaged onto a spot aperture 18 approximately the size of the facsimile resolution element formed in a shield plate 19 and then into a lens 14. Imaging the arc onto the aperture can be accomplished by either placing the lamp at the focus of the lens or by employing an auxiliary relay lens 22 (shown dashed).

The conical light beam emerging from the lens is projected onto the on-axis multi-sided rotating mirror which divides the beam into as many parts as there are sides to the mirror. Since the scanner is mounted coaxially with the lens, each part of the light beam is focused to a spot the same radial distance from the lens axis while the light spot remains the same intensity and size as it advances in a circular motion by virtue of the polygon rotation. The received light at the polygon is reflected off each of the facets, as shown by the arrows, to an imaging plane at which is supported the appropriate sensing elements for utilizing the reflected light signal. As will be described more completely below, the sensing element can comprise a photomultiplier or the like for emitting corresponding signals to a transmitter circuit or can, as shown in FIG. 2, comprise a light sensitive recording surface 21 on which the information is to be permanently reproduced.

As can be seen specifically in FIG. 2, the velocity, focus or spot size, and light intensity varies slightly as the spot sweeps a flat surface, but as will be described, this can be controlled by varying the number of faces on the polygon and the focal length of the lens. Where the document or recording surface being scanned can be formed into an arc, these problems do not exist. However, with a flat surface the variation in velocity of the spot is $f(1/\cos^2 \theta)$ and since $\theta_{max.}=128°/n$ (where $n=$ the number of facets on the polygon), the velocity variation can be controlled by varying the number of polygon faces. The focus or spot size growth and the variation in the spot light intensity can be controlled by varying the $f$/no. of the objective lens. A suitable field flattener shown dashed and designated 25, can likewise be employed to correct for the circular sweep of the polygon where required for the particular application. The field flattener can be placed anywhere between the polygon and the surface being scanned.

Typically, the polygonal mirror 11 for purposes as will be described can be about 0.5 to 5 inches in diameter with 2 to 20 number of facets in accordance with the application and rotated in accordance with requirements from about 12 to 12,000 r.p.m. without encountering difficulties of manufacture or loss of reflected resolution. Motor 13 can be either AC or DC, with the latter being preferred for applications encountering fluctuating line voltages likely to affect a constant speed to be maintained. It may be directly or indirectly connected operably to the turntable 12.

As will be understood from the description of subsequent figures, the basic scanner thus described has wide and versatile utility. It offers many combined advantages which are not available or only individually available in some of the prior art scanners cited above. Particularly, it should be noted that the physical size of the instant polygon is small as compared to the known block type of simple polygon prism, since the diameter thereof has only to equal or be slightly less than the lens aperture. This results in low bulk of the rotating parts to provide relatively low inertia as to permit wide variations of speed without extensive balancing structure as is required by more massive scanners at high velocities. It also enables fabrication and manufacture at relatively low cost as compared to prior devices. Likewise, the variation in light transmission through the system because of edge fall-off is substantially lower than previously required. At the same time in contrast to previous systems, the spot size transmitted can be easily adapted to suit the needs for the particular utility of application. By controlling scan length, the blank time at which there would otherwise be an absence, or very low, light transmission can be reduced to substantially zero. Unlike previous designs in which the lens aperture size is restricted by the blank time that can be tolerated, the unit hereof has no such restriction since the blanking time can be as small as required, including zero, permitting the lens aperture size to be enlarged as required for the light source available.

Figure 3:
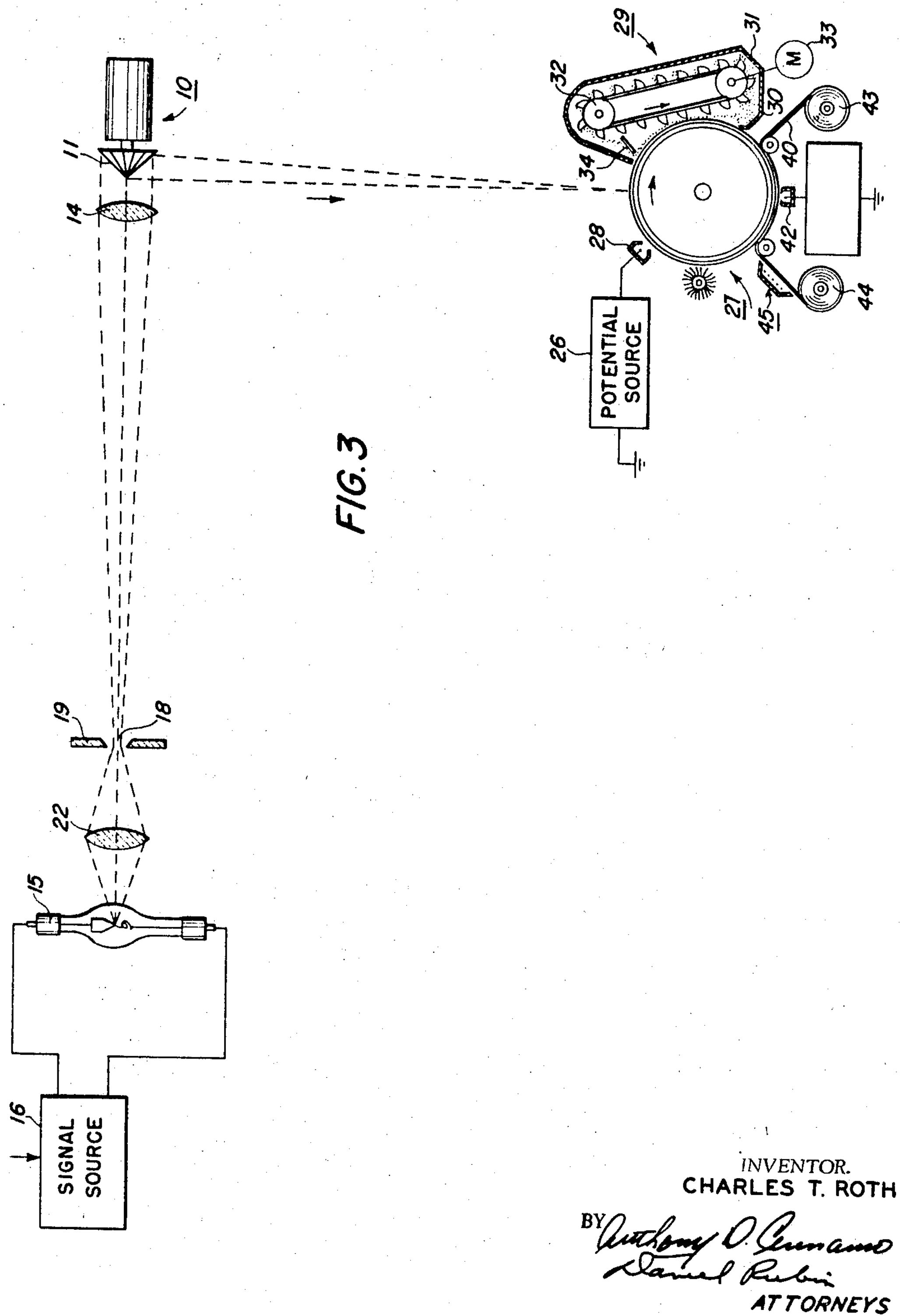
FIG. 3 is a schematic component arrangement of a facsimile recorder-receiver system employing the scanner hereof.

Referring now to FIG. 3, the basic scanning apparatus is shown as adapted for recording received information pulses, as for example, transmitted to a receiver of a facsimile system. Information intelligence remotely generated is therefore transmitted in the form of electrical pulses to signal source 16 which in response to and for the duration of the pulse emits an energizing pulse to high intensity arc lamp 15. Lamp 15 may comprise a well known type, such as a xenon arc lamp, mercury arc lamp, or the like which can be momentarily pulsed for a time period coincident with that applied to effect a high illumination intensity. The light intensity emitted thereby is then conducted as before through a relay lens 22 which focuses the transmitted light through spot aperture 18. That quantity of passed light is then focused by projection lens 14 onto the coaxially rotating polygon mirror 11 which in turn reflects the light in various directions including a downward reflection shown. Supported at the object plane is a light sensitive recording surface shown herein by way of example as a xerographic drum 27. The xerographic process, as is well known in the art, utilizes a drum having a photoconductive surface on a conductive substrate that is sensitized prior to exposure by means of a corona generating device 28 which is energized from a suitable high potential source 26. Exposure of the drum by the light reflected from the scanner discharges the photoconductive layer in the areas struck by light, whereby there remains on the drum surface an electrostatic latent image corresponding to the light image projected. Following exposure the remaining charge is developed by a developing apparatus 29 in which a two component developer 30, which may be of the type disclosed in Walkup Patent 2,638,416, is cascaded over the drum surface. Developer material is stored at the bottom of the housing 31 wherefrom conveyor 32, driven by motor 33, scoops the material and releases it onto chute 34. This permits the developer to slide down and cascade over the electrostatic latent image to effect its development.

After developing, the powder image is electrostatically transferred to a paper web support surface 40 by means of a second corona generating device 42 as the paper advances from a supply spool 43 over suitable guide rolls into surface contact with the drum in the vicinity of corona generating device 42. The web bearing the image then passes through a fuser 45 before being wound onto takeup spool 44. It is to be understood that the xerographic reproduction system is intended as exemplary only and it should be apparent that any other well known light sensitive recording system could likewise be substituted for that shown.

Figure 4:
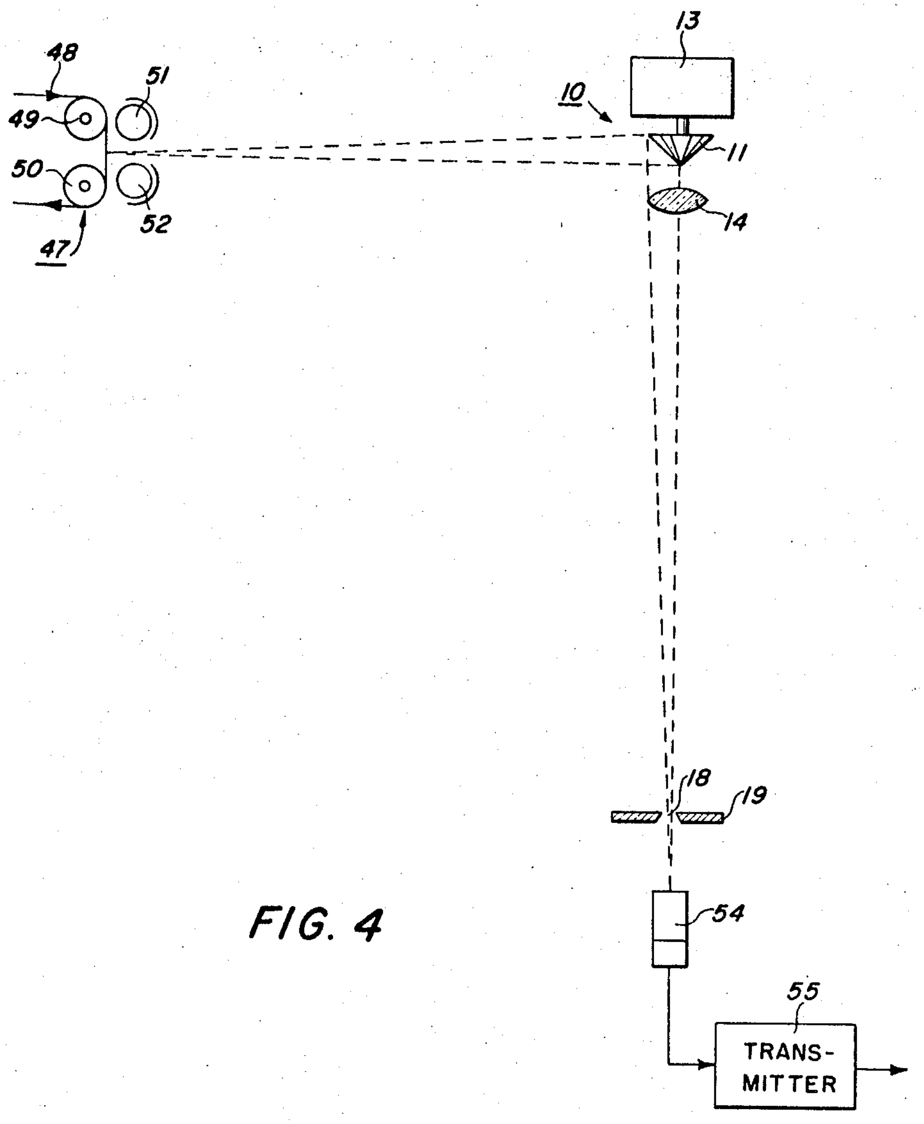
FIG. 4 is a schematic component arrangement of a transmitter system employing the scanner hereof for transmitting graphic information in a facsimile system from a moving original document.

Referring now to FIG. 4, the basic scanning device hereof is disclosed in a transmitter mode in which any suitable form of moving original, such as an opaque document sheet or the like, is advanced past an exposure position at an exposure station 47. As here shown, an original document 48 is advanced over guide rolls 49 and 50 between which is formed an exposure plane whereat the document is brightly illuminated by one or more continuously energized high intensity lamps 51 and 52. Movement of the original and rotation of the scanning mirror 11 are synchronized such that images from the original are continuously reflected from the mirror. The mirror reflections pass through one side of a coaxially mounted projection lens 53 to be projected through defining aperture 18 into a photoelectric light sensor 54. With each light pulse emitted to the light sensor, a discrete electrical signal is emitted thereby into a transmitter 55 for transmitting an amplified corresponding signal, as in a facsimile system, to a remote receiver not shown.

Figure 5:
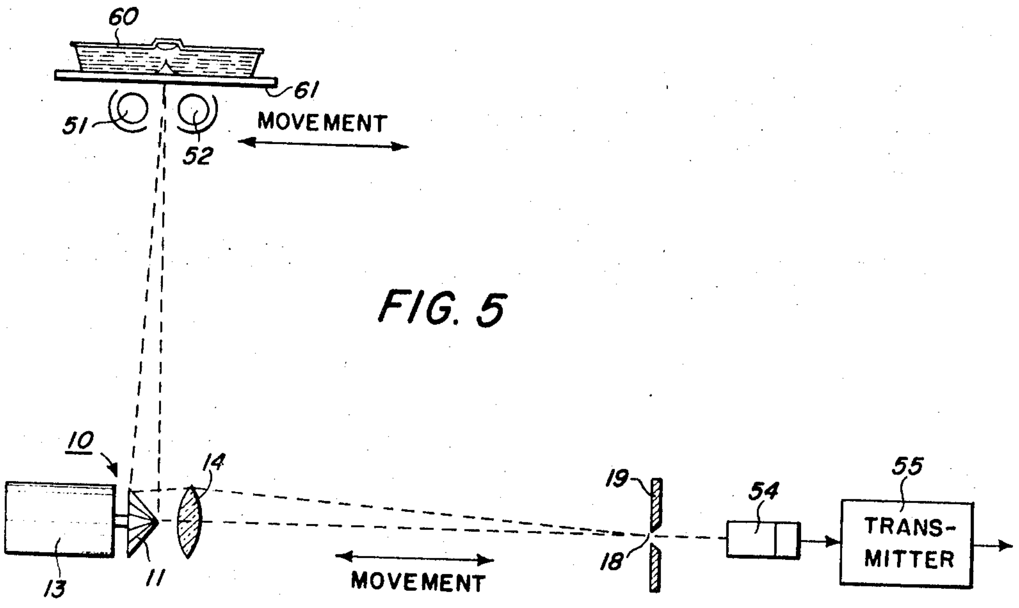
FIG. 5 is a schematic component arrangement of a transmitter system employing the scanner hereof for transmitting graphic information in a facsimile system from a stationary original document.

In FIG. 5 the same basic scanning unit is similarly used as in FIG. 4 for transmitting graphic information in the form of light intelligence but differs from that of the previous figure in its adaptation for scanning a stationary object original 60 such as a book, magazine, letter or the like. The original document is supported on a transparent platent 61 while lamps 51 and 52 are caused to traverse the platen to illuminate the object in a scanning movement. Projection is similar as before with the light received by the scanning unit being reflected through projection lens 14 to be projected through aperture 18 into light sensor 54. In order to maintain the optical path concomitantly with the moving lamps, the scanning mechanism, the projection lens, and the light sensor are integrally mounted to similarly be shifted in unison.

Figure 6:
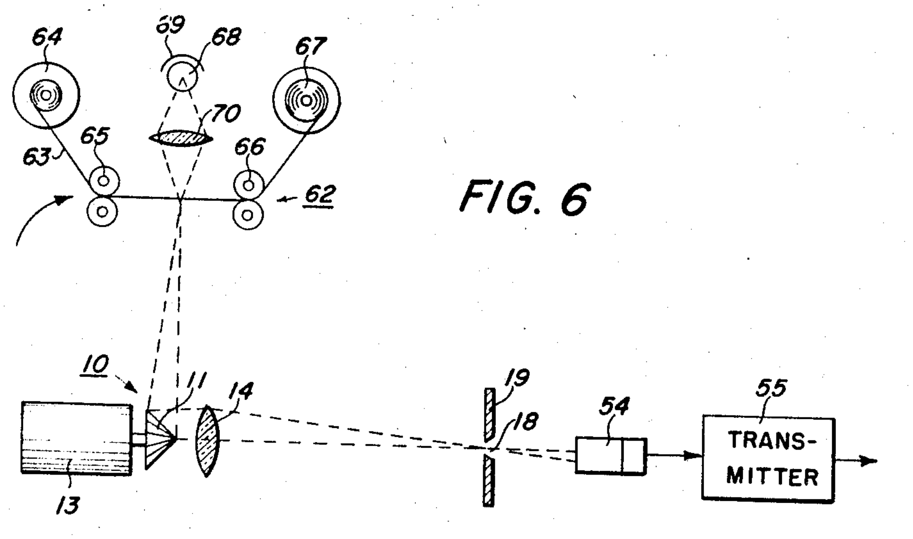
FIG. 6 is a schematic component arrangement of a transmitter system employing the scanner hereof for transmitting graphic information in a facsimile system from a moving transparency such as microfilm.

In FIG. 6 there is disclosed a transmitter system similar to that described in connection with FIG. 4 but adapted to accommodate microfilm images either on a continuous reel or separately supported in electronic accounting machine (EAM) cards of a type known in the art. As there shown at an exposure station 62 is a supply of microfilm 63 contained on a supply spool 64 from which it is advanced over a guide roll 65 into an exposure plane before passing over a guide roll 66 and onto a takeup roll 67. Continuously energized lamp 68 and a reflector 69 provide continuous illumination through condenser lens 70 focused onto the passing microfilm 63.

Figure 7:
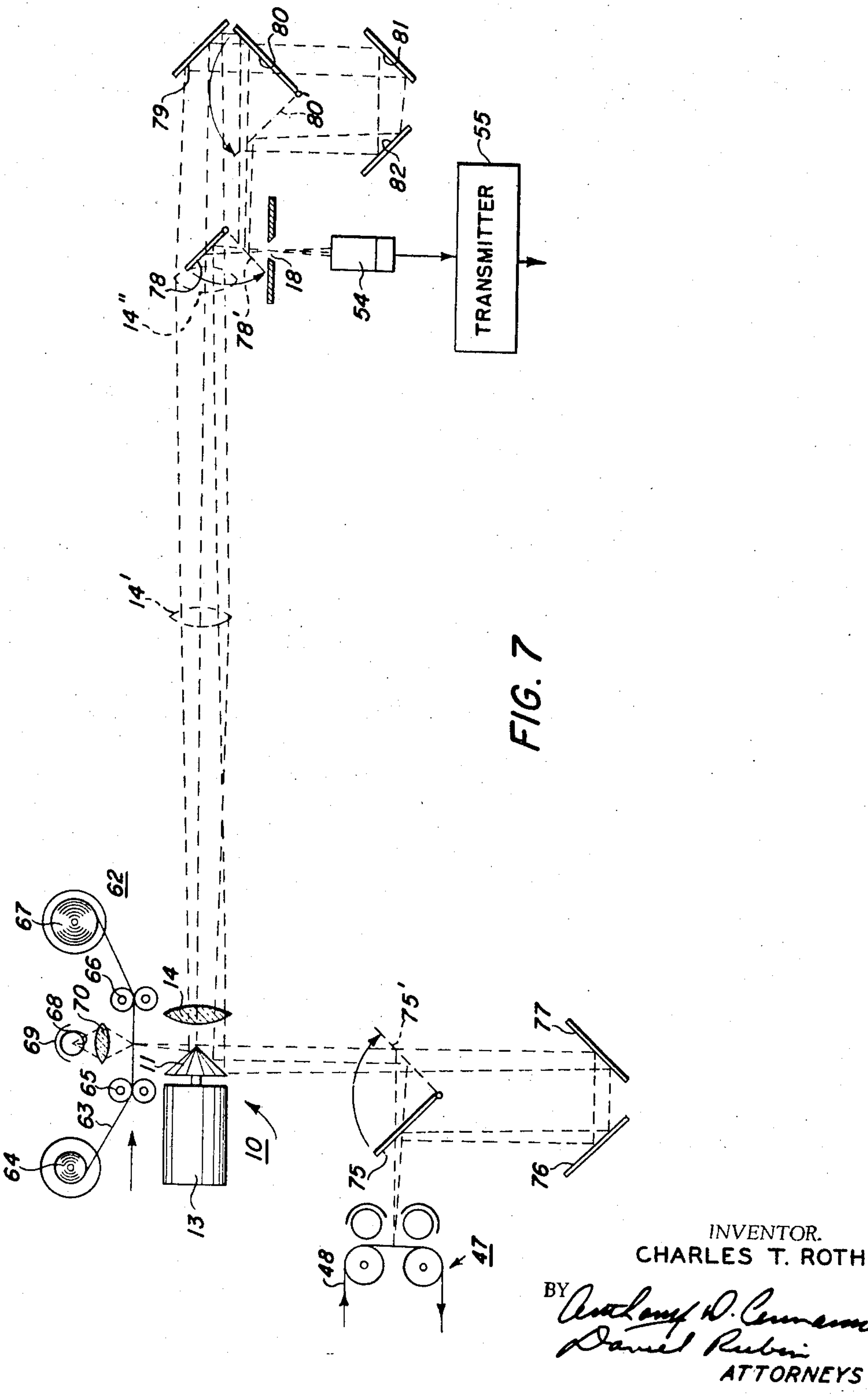
FIG. 7 is a schematic component arrangement of a transmitter in a facsimile system adapted for universal input from a plurality of different original document forms.

As shown in FIG. 7 the scanner hereof is employed in a universal input transmitter system. In accordance with this embodiment, the original document can comprise any of a variety of different image sources and sizes to be scanned by the scanner 10 for transmission to light sensor 54 and transmitter 55. Accordingly, a variety of different inputs of original documents are contained in an integral unit optically mounted relative to the scanner and can be utilized in the alternative when accompanied by appropriate settings of certain of the optical components to compensate for changes in magnification ratio and position of origin.

For reproducing for example, opaque copy station 47, similar to that described above in connection with FIG. 4, and adapted to accommodate originals of different size as, for example, 8½" x 11" or 18" x 24". For reproducing the latter size, the images on the original 48 are reflected onto pivotal mirror 75 (where shown solid) from where the image is reflected downwardly to mirror 76 across to mirror 77 and then upward into the scanning mechanism 10. The transmitted light from the scanner passes through adjustably positioned projection lens 14 (where shown solid) to be reflected by pivotal mirror 78 (where shown solid) downwardly through the aperture 18 to light sensor 54. For reproducing the smaller size original, mirror 75 is pivoted to the right position (shown dashed) and designated 75' whereby to reflect the images from the original directly onto the scanning mechanism 10. The projection lens for this size copy is positioned (shown dashed) and designated 14'. Mirror 78 is pivoted to its downward position (shown dashed) and designated 78' permitting the light transmitted from the lens to be reflected into mirror 79 onto pivotal mirror 80 (where shown solid) to mirror 78' and then downward through aperture 18 as before.

To operate in the alternative for reproducing microfilm, there is provided a microfilm station 62 similar to that shown in FIG. 6 for projecting microfilm images contained either on a continuous web or EAM cards as described above. When operating in this mode, the projection lens 14 is positioned relatively furthest from the scanner in a position (shown dashed) and designated 14''. Mirror 80 is pivoted leftwardly to a position (shown dashed) and designated 80' such that the transmission through the lens is projected onto the mirror 79 downward onto mirrors 81 and 82 then up to mirror 80' across to mirror 78' in its down position and through aperture 18. Accordingly whatever form or size original is to be scanned and transmitted by the scanning mechanism 10 appropriately positioning of the projection lens along the rotational axis of mirror 11 while resetting the optical path length by use of an appropriate combination of mirrors, any of the various inputs can be used in the alternative.

Figure 8:
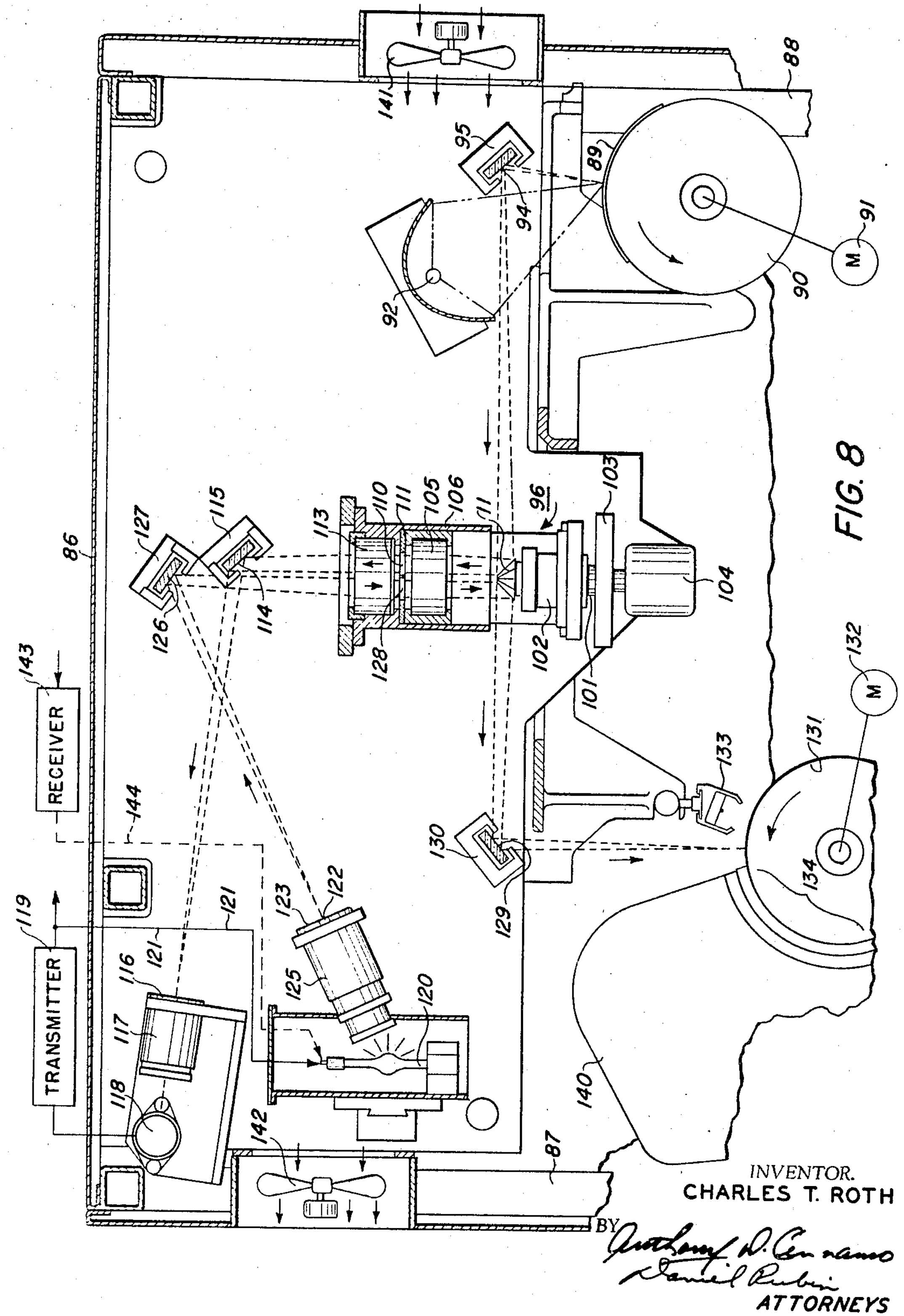
FIG. 8 is an elevation view of a transmitter-receiver apparatus in accordance with the invention.

In FIG. 8 there is shown the transmitter-receiver apparatus in accordance with the invention. The apparatus is termed a "transceiver" being adapted for both transmitting and receiving recording and utilizing the scanner hereof. By appropriate utilization of its components the apparatus can simultaneously transmit and record graphic information contained on an original document, can transmit one document while receiving recording another, or can either separately transmit or record as will be understood. The apparatus comprises a cabinet housing 86 enclosing the components and including frame braces sections 87 and 88.

For transmitting, the information originates from an original document 89 secured about the periphery of a drum 90 rotated continuously by means of motor 91. As the document advances past an exposure station, it is illuminated by a high intensity lamp 92 supported beneath an adjustable light reflector 93. Light from the lamp is focused along a line on the document surface extending axially with the drum as the document advances therepast. Reflection from the illuminated line of the document is received by a mirror 94 supported parallel to the drum axis in a mount 95 and wherefrom the image is reflected into the face of the polygon scanner mechanism 96.

The scanner is similar to that described above and comprises a truncated or pyramidal polygonal mirror 11 axially secured on a vertical shaft 101 extending through bearing housing 102 to flywheel 103 that is directly coupled to motor 104. The motor affects continuous accurate rotation of the polygon scanning the reflected image received from mirror 94 while the flywheel serves to filter mechanical noise and smooth out pulsations. The light image thus received is transmitted vertically upward through a first element 105 of a coaxial lens system adjustably secured in lens barrel 106. The light passing through that portion of the lens, as indicated by the upward arrow, then passes through an aperture 110 in aperture plate 111 through a second element 113 of the same lens system to be focused onto a mirror 114 secured in a mirror mount 115. From the latter mirror, the images thereon are reflected through an aperture plate 116, similar to plate 19 described above, wherefrom the passing light enters a diverging lens 117 to impinge on a photomultiplier tube 118. The sensing signal from the photomultiplier tube is then transmitted to circuitry encompassed by transmitter box 119 to emit the appropriate facsimile signal for communication to a remotely located facsimile receiver which may be operable similarly as described below.

For simultaneously recording the transmitted information the same emitted signal from the transmitter via lead 121 is used to modulate the high intensity lamp 120 similar to lamp 15 described above. The light modulated signal therefore is emitted by the lamp in response to received pulses from the transmitter 119 to be conducted via lens assembly 125 and through an aperture 122 in plate 123 onto an optically positioned mirror 126 in mirror mount 127. The reflected light signal from the latter mirror is then reflected downwardly to the other portion of lens element 113 as, indicated by the downward arrow, through an aperture 128 and through the opposite portion of lens element 105 to the opposite surface of polygonal mirror 11. The light thus transmitted to the faces of the mirror on this portion of the polygon is reflected into a stationary mirror 129 in a mirror mount 130. From this mirror the reflection extends downwardly onto the sensitized surface of a recording member such as a xerographic drum 131 being continuously rotated by a motor 132. The recording member, as stated previously, can comprise any suitable material capable of recording in response to a light exposure thereof.

In the preferred embodiment the recording member comprises a xerographic drum that includes a cylindrical member mounted in suitable bearings in the frame of the machine and is driven in a counterclockwise direction by the motor at a constant rate that is proportional to the transport rate of the copy on the document drum 90 whereby the peripheral rate of the drum 131 is identical to the rate of movement of the reflected image being received onto mirror 129. The drum surface comprises a layer of photoconductive material on a conductive backing that is sensitized prior to exposure by means of corona generating device 133 energized from a suitable high potential source. Exposure of the drum to the light transmitted discharges the photoconductive layer in the areas struck by light, whereby there remains on the drum a latent electrostatic image in image configuration corresponding to the light image transmitted. As the drum surface continues its movement the electrostatic image passes through a developing station 134 whereat a two-component developing material contained in a housing 140 is cascaded over the drum surface to effect development of the charges on the drum surface in the manner described with regard to FIG. 3 and further described in U.S. Patent 3,062,109.

The developed image thus formed is subsequently transferred to a second support surface such as paper on which the transferred image is fused to form a permanent copy corresponding to the original document 89.

When desired to simultaneously record a different document than that supported on drum 90, or when wanting to record without the transmitting portion of the apparatus being operable, lamp 120 is modulated via lead 144 similarly from an externally received signal emitted by receiver 143. By this means the scanner mechanism 96 can be simultaneously employed for transmitting graphic intelligence from an original 89 while simultaneously receiving graphic intelligence from a remote transmitter for recording onto xerographic drum 131. Likewise, the recording portion of the apparatus can be rendered inoperable while the transmitting portion is utilized alone as described above. The advantages of this combination device employing but a single scanning unit for simultaneous transmission and receival of optical information should be instantly apparent in that it enables employing a single unit in place of duplicate components as has been required previously.

Blower fans 141 and 142 located in opposite walls of the cabinet provide a continuous air flow for maintaining the components at or slightly above ambient temperature.

By the above description there has been disclosed novel facsimile apparatus for transmitting and/or receiving-recording information intelligence. The apparatus is compact and efficient in operation affording greater flexibility of utility than comparable duplex units employed in the prior art.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A facsimile apparatus comprising in combination:

(a) support means to support a document copy in a position to be scanned;

(b) optically sensitive recording means for recording information intelligence;

(c) a common optical scanning means optically aligned with each of said support means and said recording means for optically transmitting intelligence both from copy on said support and to said recording means;

(d) photoelectric sensor means optically aligned with said scanning means to receive the optical intelligence transmitted from the copy on said support and to emit remotely transmittable electrical pulse signals corresponding thereto; and (e) signal modulatable light means energized in response to received electrical pulse signals of information intelligence and optically aligned with said scanning means for transmitting light therefrom to said recording means.

2. The apparatus according to claim 1 in which the emitted transmittable signals from said sensor means are also connected to said light means to effect a simultaneous recording of the copy on said recording means.

3. The apparatus according to claim 1 including a signal source for energizing said light means in response to remotely received information intelligence and said scanning means is operable to simultaneously transmit both from copy on said support and said lamp means.

4. Apparatus according to claim 1 in which said recording means comprises a xerographic plate and there is included means to apply an electrostatic charge on the surface thereof prior to being optically exposed from said scanning means.

5. A facsimile apparatus comprising in combination:

(a) support means to support a document copy in a position to be scanned;

(b) optically sensitive recording means for recording information intelligence;

(c) a common optical scanning means optically aligned with each of said support means and said recording means and comprising an at least partially pyramidally formed multi-faced mirror rotating continuously about a concentric axis extending from its base;

(d) a projection lens supported with its optical axis coaxially aligned with the rotational axis of said scanning means;

(e) photoelectric sensor means optically aligned with said lens to receive projected optical intelligence transmitted via said scanning means from the copy on said support and to emit remotely transmittable pulse signals corresponding thereto; and (f) signal modulatable light means energized in response to received electrical pulse signals of information intelligence and optically aligned with said lens which projects light therefrom via said scanning means to said recording means.

6. Apparatus according to claim 5 in which a first portion of said lens receives reflections from a first face position of said mirror aligned with the copy of said support and a second portion of said lens projects light from said lamp means onto a second face position of said mirror aligned with said recording means.

7. The apparatus according to claim 6 in which the emitted transmittable signals from said sensor means are also connected to said light means to effect a simultaneous recording of the copy on said recording means.

8. The apparatus according to claim 6 including a signal source for energizing said light means in response to remotely received information intelligence and said scanning means is operable to simultaneously transmit both from copy on said support and said lamp means.

9. Apparatus according to claim 6 in which said recording means comprises a xerographic plate and there is included means to apply an electrostatic charge on the surface thereof prior to being optically exposed from said scanning means.

References Cited

UNITED STATES PATENTS

| | | | |
|---|---|---|---|
| 1,787,921 | 1/1931 | Watson | 178—7.3 |
| 3,064,077 | 11/1962 | Cary | 178—6.6 |
| 3,316,348 | 4/1967 | Hufnagel et al. | 178—7.6 X |

ROBERT L. GRIFFIN, *Primary Examiner.*

RICHARD K. ECKERT, Jr., *Assistant Examiner.*

U.S. Cl. X.R.

178—7.1, 7.3, 7.6

PO-1050
(5/69)

UNITED STATES PATENT OFFICE
CERTIFICATE OF CORRECTION

Patent No. 3,426,144 Dated February 4, 1969

Inventor(s) Charles T. Roth

It is certified that error appears in the above-identified patent and that said Letters Patent are hereby corrected as shown below:

Column 8 lines 40 and 74, the claim term "lamp" each occurrence should read--light--. Column 9 line 9, the claim term "lamp" should read--light--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents